Patented Oct. 21, 1952

2,615,022

UNITED STATES PATENT OFFICE 2,615,022

PRODUCTION OF SUBSTITUTED PYRIDINES

John E. Mahan, Bartlesville, Okla., assignor to Phillips Petroleum Company, a corporation of Delaware No Drawing. Application December 27, 1949, Serial No. 135,291

27 Claims. (Cl. 260—290)

This invention relates to a process for the production of substituted pyridines. In one aspect this invention relates to a process for the produtcion of alkyl substituted pyridines by the catalytic condensation of aldehydes and ketones. In one specific embodiment this invention relates to a novel process for the production of 2-methyl-5-ethyl pyridine.

Pyridine homologs are useful as intermediate compounds in the production of pyridine derivatives containing unsaturated side chains, such as the vinyl pyridines which are capable of undergoing copolymerization with other unsaturated organic compounds, such as butadiene, to produce potentially useful synthetic rubbers. Vinyl pyridines can be prepared from pyridine homologs, such as 2-methyl-5-ethyl pyridine which is also known as aldehyde collidine and aldehydin, by various methods. For example, 2-methyl-5-ethyl pyridine may be reacted with formaldehyde to produce the monomethylol derivative which, upon dehydration, produces 2-vinyl-5-ethyl pyridine. Also, the ethyl group in 2-methyl-5-ethyl pyridine may be dehydrogenated to produce 2-methyl-5-vinyl pyridine.

The condensation of aldehydes and ketones, either saturated or unsaturated, and derivatives thereof with ammonia or its derivatives to form substituted pyridines is one of the oldest of organic reactions. See R. L. Frank et al., Journal of the American Chemical Society, 71, pages 2629 et seq. (August 1949) and R. L. Frank et al., Journal of the American Chemical Society, 68, pages 1368-9 (July 1946). The condensation reactions have been effected non-catalytically, and ammonium acetate and alumina have been employed in the prior art as catalysts for the reaction. Also, ammonium chloride has been reported as showing the same effect as ammonium acetate. However, the prior art methods have a poor reputation for commercial production because of the formation of mixtures of pyridines and various by-products. In addition, when operating according to the prior art, relatively low yields of individual products have usually been reported.

It is an object of this invention to provide a novel process for the production of substituted pyridines.

It is another object of this invention to provide a process for the production of substituted pyridines that eliminates difficulties in the prior art processes.

It is another object of this invention to condense aldehydes and ketones and their derivatives with ammonia in the presence of novel catalysts for the reaction.

It is another object of this invention to provide a novel process for the production of 2-methyl-5-ethyl pyridine from low-boiling aldehydes and ammonia.

It is a further object of this invention to employ novel catalysts for the condensation of low-boiling aldehydes and ammonia to produce 2-methyl-5-ethyl pyridine.

Further and additional objects of my invention will be apparent from the disclosure and description hereinbelow.

I have found that substituted pyridines can be produced by the improved method of reacting an organic aldehyde or ketone or derivative thereof with ammonia in the presence of fluorine-containing catalysts.

According to my invention, ammonia and an organic aldehyde, ketone or derivative thereof that is known to condense with ammonia to form substituted pyridines are reacted in the presence of a fluorine-containing catalyst. Throughout this disclosure I will refer to the aldehydes, ketones and derivatives thereof as carbonyl compounds. The carbonyl compounds within the scope of my invention are known in the art, and illustrative examples of these compounds are set forth in detail in the above-named references. To produce 2-methyl-5-ethyl pyridine I prefer to use an aldehyde containing no more than six carbon atoms per molecule, such as acetaldehyde, crotonaldehyde, and paraldehyde. However, my invention is not limited in scope to the production of this particular pyridine derivative nor to the use of the specific aldehydes. For example, aldehydes and ketones, i. e. benzalacetophenone, benzaldiacetophenone, ethylidene acetone, p-chlorobenzaldiacetophenone, and anisaldiacetophenone, may be condensed with ammonia to form pyridine derivatives. In addition, mixtures of aldehydes and ketones, for example benzaldehyde and acetophenone, benzaldiacetophenone and acetophenone, benzaldehyde and desoxybenzoin, benzalacetone and acetophenone, and benzalacetone and acetone, may be employed to form pyridine derivatives.

The catalysts that I employ are fluorine-containing catalysts or fluorine-containing condensing agents. These catalysts are salts of fluorine-containing acids, and with these catalysts I found that I could obtain results superior to those obtained in prior art processes. The preferred fluorine-containing condensing agents are ammonium fluoride ($NH_4F$), ammonium bifluoride ($NH_4F \cdot HF$), boron trifluoride, preferably in a complex with ammonia or an amine, salts of fluoroboric acid, salts of the fluorophosphoric acids, salts of trifluoroacetic acid and salts of fluosilicic acid. The salts of the acids named above are preferably the ammonium or metallic salts of the acids.

Fluorine-containing condensing agents are novel catalysts for this process, and, although it is not essential to the course of the reaction, I have found it preferable to employ the catalysts in relatively small amounts. Usually from 0.2 to 10.0, preferably 1.5 to 5.0, weight per cent of catalyst based on the carbonyl compound is employed.

Mol ratios of ammonia to carbonyl compound undergoing condensation within the range of 1:1 to 12:1 are utilized, but higher ratios are operable in my process. I prefer to use mol ratios of ammonia to carbonyl compound within the range of 2:1 to 9:1 in order to maintain the volume of material to be handled at a low level.

The ammonia for the reaction is usually in an aqueous solution, but in some instances it may be desirable to conduct the reaction with anhydrous liquid ammonia. When an aqueous ammonia solution is utilized for the reaction, ammonia and water are supplied to the reaction in a ratio such that a solution containing 10 to 90 weight per cent ammonia is formed.

Optimum reaction temperatures are within the range of 300 to 650° F., preferably 450 to 550° F. The reaction is usually effected in the liquid phase, and, consequently, pressures at least sufficient to maintain the reaction mixture in liquid phase are employed. When operating with a closed pressure reactor, the autogenous pressures developed by the reaction mixture at the reaction temperature are satisfactory. These pressures are usually within the range of 850 to 2500 pounds per square inch gauge. The reaction period, or the time during which the reaction mixture is maintained at the desired reaction temperature, may vary from 5.0 minutes to 5.0 hours, preferably no longer than 2.0 hours. However, the data hereinbelow show that good yields of substituted pyridines can be obtained by cooling the reaction mixture, such as by quenching in ice water, as soon as the desired reaction temperature is attained. I have also found it desirable to cool the reaction mixture rapidly, such as by quenching in ice water, after the desired reaction period has expired. In this manner improved yields are obtained over procedures wherein the reaction mixture is allowed to cool slowly after expiration of the reaction period. Reaction periods longer than 2.0 hours may be used, but they are not essential to the process. Little, if any, advantage is gained by so operating, and, actually, the longer reaction periods may be conducive toward decomposition of the reaction products, resulting in decreased yields of the desired substituted pyridines. At the end of the desired reaction period, the temperature is lowered to about room temperature, and the substituted pyridines are recovered from the reaction mixture by any suitable method, such as fractional distillation.

In some instances it may be found desirable to employ an emulsifying agent in the reaction mixture. It is preferred that any emulsifying agent so employed be soluble in at least one of the components of the reaction mixture. Emulsifying agents that may be used include salts of saturated or unsaturated fatty acids containing at least six and not more than 18 carbon atoms, sulfates, such as lauryl sulfate, and sulfonates, such as alkaryl sulfonates. Non-ionic detergents, such as ethylene oxide condensation products of organic acids, alcohols, mercaptans, phenols, amides, and the like, as well as cationic surface active agents of the quaternary ammonium ion type may also be used.

Although I have described my invention as a batch process, the invention may also be practiced in a continuous operation, and such operation is within the scope of my invention. In one embodiment of a continuous process, reactants are introduced continuously to a suitable pressure reactor from which a portion of the reaction mixture is withdrawn continuously. Reaction products are separated therefrom, and unchanged reactants are then recycled to the reactor.

The examples hereinbelow are illustrative of my invention. In these experiments a stainless steel bomb of 1400 milliliter capacity was employed. The bomb was provided with a thermometer well, and the bomb was wrapped with resistance wire and thus heated electrically. In conducting the experiments the bomb was charged with reactants, such as paraldehyde, aqueous or liquid ammonia and catalyst (when used) and firmly sealed. Air was removed from the bomb by adding nitrogen to a pressure of one hundred pounds per square inch and venting until the pressure was again atmospheric. A period of one hour to one and one-half hours was required for the bomb to attain the desired reaction temperature, and the duration of the run was the interval of time that the bomb was held at the desired reaction temperature. Agitation of the bomb was provided by an electrically driven platform rocker. At the end of the reaction period the reaction mixture was cooled and acidified with hydrochloric acid. Volatile non-basic material was removed by steam distillation, and the residue was made strongly basic with sodium hydroxide to liberate the organic bases and again steam distilled. The distillate was also treated with sodium hydroxide to enable a thorough extraction of the pyridine derivatives with chloroform. This extract was stripped of chloroform, and the remaining liquid was thence fractionated to recover the pyridine derivatives.

Example I

A series of four runs was made to demonstrate the superior yields obtained when using the catalytic materials of my invention. Two runs were made according to prior art methods, i. e. non-catalytically and with ammonium acetate as a catalyst, and two runs were made using fluorine-containing catalysts. The runs were made under substantially identical reaction conditions of temperature, pressure, mol ratios of reactants, and the like. The observed data are tabulated below.

| Catalyst | None | Ammonium Acetate | Boron trifluoride-Ammonia Complex | Ammonium fluoride |
|---|---|---|---|---|
| Weight of catalyst, gms | None | 6.6 | 7.2 | 7.2 |
| Paraldehyde, gms | 264 | 264 | 264 | 264 |
| Paraldehyde, mols | 2.0 | 2.0 | 2.0 | 2.0 |
| Ammonia, gms | 105.3 | 103.1 | 102.9 | 102.9 |
| Ammonia, mols | 6.19 | 6.05 | 6.04 | 6.04 |
| Mol ratio ammonia/paraldehyde | 3.09 | 3.02 | 3.02 | 3.02 |
| Water, gms | 261.7 | 264.9 | 264.1 | 264.1 |
| Gms. NH$_3$/100 gms. H$_2$O | 40.3 | 38.2 | 38.9 | 38.9 |
| Duration of run, hrs | 3.0 | 3.0 | 3.0 | 3.0 |
| Temperature, °F | 500 | 490–500 | 490–500 | 490–500 |
| Per pass yield of 2-methyl-5-ethyl pyridine (mol percent of theoretical based on paraldehyde charged) | 38.9 | 57.2 | 63.5 | 64.9 |
| Per pass yield of picolines (mol percent of theoretical based on paraldehyde charged) | 6.45 | 3.67 | 3.60 | 3.82 |

Yields were increased from 57.2 per cent to 63.5 per cent and 64.9 per cent. This represents an increase of 11 and 13.5 per cent respectively by the catalysts of the present invention over catalyst of the prior art.

Example II

A series of three runs was made to demonstrate further the superior yields obtained by practicing my invention when compared with prior art methods. Reaction conditions for the runs were substantially identical, and the observed data are tabulated below.

| Catalyst | None | Ammonium Acetate | Boron trifluoride Ammonia Complex |
|---|---|---|---|
| Weight of catalyst, gms | None | 7.2 | 6.8 |
| Paraldehyde, gms | 185 | 170 | 170 |
| Paraldehyde, mols | 1.40 | 1.286 | 1.286 |
| Ammonia, gms | 166.5 | 177 | 173 |
| Ammonia, mols | 9.79 | 10.40 | 10.17 |
| Mol ratio ammonia/paraldehyde | 6.99 | 8.09 | 7.91 |
| Water, gms | 89.0 | 95.3 | 93.0 |
| Gms. NH$_3$/100 gms. H$_2$O | 187 | 186 | 186 |
| Duration of run, hours | 3.0 | 3.0 | 3.0 |
| Temperature, °F | 485–495 | 495–500 | 490–500 |
| Per pass yield of 2-methyl-5-ethyl pyridine (mol percent of theoretical based on paraldehyde charged) | 54.6 | 61.1 | 68.0 |
| Per pass yield of picolines (mol percent of theoretical based on paraldehyde charged) | 5.67 | 3.44 | 2.42 |

In this series of runs the yield was increased from 61.1 per cent to 68.0 per cent. This represents an increase of 11.3 per cent by the catalyst of the present invention over the catalyst of the prior art.

Example III

A run was made according to the present invention employing boron trifluoride-ammonia complex as a catalyst. The data below, when compared with the data in Examples I and II, demonstrate the results obtainable when the reaction conditions are varied.

| Catalyst | Boron trifluoride-Ammonia Complex |
|---|---|
| Weight of catalyst | 6.8 |
| Paraldehyde, gms | 170 |
| Paraldehyde, mols | 1.286 |
| Ammonia, gms | 173 |
| Ammonia, mols | 10.17 |
| Mol ratio ammonia/paraldehyde | 7.91 |
| Water, gms | 214 |
| Gms. NH$_3$/100 gms. H$_2$O | 80.7 |
| Duration of run, hours | 3.0 |
| Temperature, °F | 490–500 |
| Per pass yield of 2-methyl-5-ethyl pyridine (mol percent based on paraldehyde charged) | 71.8 |
| Per pass yield of picolines (mol percent based on paraldehyde charged) | 2.59 |

Example IV

A run was made according to the present invention employing ammonium fluoride as a catalyst. The reaction conditions differed from those in Example I, and the observed data are tabulated below.

| Catalyst | Ammonium Fluoride |
|---|---|
| Weight of catalyst | 6.8 |
| Paraldehyde, gms | 170 |
| Paraldehyde, mols | 1.286 |
| Ammonia, gms | 174 |
| Ammonia, mols | 10.22 |
| Mol ratio ammonia/paraldehyde | 7.95 |
| Water, gms | 212 |
| Gms. NH$_3$/100 gms. H$_2$O | 82 |
| Duration of run, hours | 3.0 |
| Temperature, °F | 490–500 |
| Per pass yield of 2-methyl-5-ethyl pyridine (mol percent of theoretical based on paraldehyde charged) | 71.8 |
| Per pass yield picolines (mol percent of theoretical based on paraldehyde charged) | 1.92 |

Example V

Two comparative runs were made employing ammonium bifluoride as a catalyst. In the first run the reaction temperature was maintained for 0.5 hour, and the reaction mixture was then quenched to room temperature. In the second run the reaction mixture, after being brought to the reaction temperature, was immediately quenched to room temperature. The observed data are tabulated below.

| Catalyst | Ammonium Bifluoride | |
|---|---|---|
| Weight of catalyst, gms | 6.8 | 6.8 |
| Paraldehyde, mols | 1.29 | 1.29 |
| Ammonia, mols | 10.166 | 10.166 |
| Mol ratio ammonia/paraldehyde | 7.9:1 | 7.9:1 |
| Water, gms | 210 | 210 |
| Gms. NH$_3$/100 gms. H$_2$O | 82.0 | 82.0 |
| Duration of run, hours | 0.5 | |
| Temperature, °F | 490–500 | 490–500 |
| Per pass yield of 2-methyl-5-ethyl pyridine (mol per cent of theoretical based on paraldehyde) | 76.7 | 61.3 |
| Yield of picolines, gms | 3.0 | 3.6 |

*Example VI*

A run was made wherein aqueous hydrogen fluoride was charged to the reactor prior to the introduction of the ammonia, and the reaction was catalyzed in this manner. The observed data are calculated below.

| | |
|---|---|
| Catalyst (gms.) | 1.4 |
| Paraldehyde (mols) | 1.286 |
| Ammonia (mols) | 10.71 |
| Mol ratio ammonia/paraldehyde | 7.91 |
| Water added in charge (gms.) | 211 |
| Conc. aqueous ammonia in chage (per cent) | 45 |
| Length of run (hrs.) | 0.5 |
| Temperature (°F.) | 495–505 |
| Yield 2-methyl-5-ethyl pyridine (gms.) | 85.4 |
| Yield 2-methyl-5-ethyl pyridine (mol per cent) | 73.2 |
| Yield picolines (gms.) | 2.0 |
| Total weight pyridines (gms.) | 99.5 |

Instead of introducing the hydrogen fluoride and ammonia to the reactor separately, desirable results are obtainable by charging the hydrogen fluoride to the reactor with the ammonia.

*Example VII*

Pyridine derivatives are obtainable by the interaction of acetaldehyde, crotonaldehyde and benzaldehyde with ammonia in accordance with the process disclosed herein.

*Example VIII*

Salts of fluoroboric acid, the fluorophosphoric acids, trifluoroacetic acid and fluosilicic acid produce good yields of pyridine derivatives in accordance with the process disclosed herein.

Numerous modifications within the scope of my invention will be apparent from my disclosure to those skilled in the art.

I claim:

1. In a process for producing pyridine derivatives by the interaction of a carbonyl compound selected from the group consisting of aldehydes and ketones with ammonia, the improvement which comprises effecting the reaction in the presence of a fluorine-containing catalyst selected from the group consisting of ammonium fluoride, ammonium bifluoride, boron trifluoride, boron trifluoride-ammonia complex, boron trifluoride-amine complexes, salts of fluorboric acid, salts of the fluorophosphoric acids, salts of trifluoracetic acid, and salts of fluosilicic acid.

2. The process for producing pyridine derivitives which comprises reacting a low-boiling aldehyde with ammonia in the presence of a catalyst selected from the group consisting of ammonium fluoride, ammonium bifluoride, boron trifluoride, boron trifluoride-ammonia complex, boron trifluoride-amine complexes, salts of fluoroboric acid, salts of the fluorophosphoric acids, salts of trifluoracetic acid, and salts of fluosilicic acid.

3. The process for preparing 2-methyl-5-ethyl pyridine which comprises reacting paraldehyde with ammonia in the presence of a catalyst selected from the group consisting of ammonium fluoride, ammonium bifluoride, boron trifluoride, boron trifluoride-ammonia complex, boron trifluoride-amine complexes, salts of fluoroboric acid, salts of the fluorophosphoric acids, salts of trifluoracetic acid, and salts of fluosilicic acid.

4. A process according to claim 3 wherein ammonium bifluoride is employed as a catalyst.

5. A process according to claim 3 wherein ammonium fluoride is employed as a catalyst.

6. A process according to claim 3 wherein a boron trifluoride complex with ammonia is employed as a catalyst.

7. A process according to claim 3 wherein from 0.2 to 10.0 weight per cent of the catalyst based on the paraldehyde is employed.

8. A process according to claim 3 wherein the reaction temperature is 300 to 650° F.

9. The process for preparing 2-methyl-5-ethyl pyridine which comprises contacting paraldehyde with ammonia in the presence of a fluorine-containing catalyst selected from the group consisting of ammonium fluoride, ammonium bifluoride, boron trifluoride, boron trifluoride-ammonia complex, boron trifluoride-amine complexes, salts of fluoroboric acid, salts of the fluorophosphoric acids, salts of trifluoracetic acid, and salts of fluosilicic acid at a temperature within the range of 300 to 650° F. at a pressure sufficient to maintain the reaction mixture in liquid phase and employing from 0.2 to 10.0 weight per cent of catalyst based on the paraldehyde.

10. A process according to claim 9 wherein the reaction period is within the range of 5.0 minutes to 5.0 hours.

11. A process according to claim 9 wherein the ammonia and paraldehyde are employed in a molar ratio within the range of 1:1 to 12:1.

12. A process according to claim 9 wherein sufficient water is present in the reaction mixture to produce a solution with the reactant ammonia containing 10 to 90 weight per cent ammonia.

13. A process according to claim 3 wherein the reaction temperature is 450 to 550° F.

14. A process according to claim 3 wherein the ammonia and paraldehyde are employed in a molar ratio within the range of 1:1 to 12:1.

15. A process according to claim 9 wherein ammonium bifluoride is employed as a catalyst.

16. A process according to claim 9 wherein ammonium fluoride is employed as a catalyst.

17. A process according to claim 9 wherein a boron trifluoride complex with ammonia is employed as catalyst.

18. A process for preparing 2-methyl-5-ethyl-pyridine which comprises reacting paraldehyde with ammonia, in the presence of sufficient water to produce a solution with the reactant ammonia containing 10 to 90 weight per cent ammonia, employing an ammonia : paraldehyde mol ratio within the range of 1:1 to 12:1, in the presence of a fluorine-containing catalyst selected from the group consisting of ammonium fluoride, ammonium bifluoride, boron trifluoride, boron trifluoride-ammonia complex, boron trifluoride-amine complexes, salts of fluoroboric acid, salts of the fluophosphoric acids, salts of trifluoracetic acid, and salts of fluosilicic acid, at a temperature within the range of 300 to 650° F., at a pressure sufficient to maintain the reaction mixture in liquid phase, for a reaction period within the range of 5 minutes to 5 hours, and employing from 0.2 to 10 weight per cent of catalyst based on the paraldehyde.

19. A process for preparing 2-methyl-5-ethyl-pyridine which comprises reacting paraldehyde with ammonia, in the presence of sufficient water to produce a solution with the reactant ammonia containing 10 to 90 weight per cent ammonia, employing an ammonia : paraldehyde mol ratio within the range of 1:1 to 12:1, at a temperature within the range of 450 to 550° F., at a pressure sufficient to maintain the reaction mixture in liquid phase, for a reaction period within the range of 5 minutes to 5 hours, and employing from 0.2 to 10 weight per cent of ammonium bifluoride catalyst based on the paraldehyde.

20. A process for preparing 2-methyl-5-ethyl-pyridine which comprises reacting paraldehyde with ammonia, in the presence of sufficient water to produce a solution with the reactant ammonia containing 10 to 90 weight per cent ammonia, employing an ammonia : paraldehyde mol ratio within the range of 1:1 to 12:1, at a temperature within the range of 450 to 550° F., at a pressure sufficient to maintain the reaction mixture in liquid phase, for a reaction period within the range of 5 minutes to 5 hours, and employing from 0.2 to 10 weight per cent of ammonium fluoride catalyst based on the paraldehyde.

21. A process according to claim 3 wherein ammonium fluoroborate is employed as a catalyst.

22. A process according to claim 3 wherein ammonium trifluoracetate is employed as a catalyst.

23. A process according to claim 1 wherein ammonium fluoroborate is employed as a catalyst.

24. A process according to claim 1 wherein ammonium trifluoracetate is employed as a catalyst.

25. A process according to claim 1 wherein ammonium bifluoride is employed as a catalyst.

26. A process according to claim 1 wherein ammonium fluoride is employed as a catalyst.

27. A process according to claim 1 wherein a boron trifluoride complex with ammonia is employed as a catalyst.

JOHN E. MAHAN.

REFERENCES CITED

The following references are of record in the file of this patent:

FOREIGN PATENTS

| Number | Country | Date |
|--------|---------|------|
| 349,184 | Germany | 1922 |

OTHER REFERENCES

Frank: J. Amer. Chem. Soc., June 1946, pp. 1368, 1369.

Ser. No. 387,106, Stitz: (A. P. C.), published July 13, 1943.